United States Patent
Liu et al.

(10) Patent No.: US 10,769,478 B2
(45) Date of Patent: Sep. 8, 2020

(54) CONVOLUTIONAL NEUTRAL NETWORK IDENTIFICATION EFFICIENCY INCREASING METHOD AND RELATED CONVOLUTIONAL NEUTRAL NETWORK IDENTIFICATION EFFICIENCY INCREASING DEVICE

(71) Applicant: VIVOTEK INC., New Taipei (TW)

(72) Inventors: Cheng-Chieh Liu, New Taipei (TW); Chia-Po Wei, New Taipei (TW); Fu-Min Wang, New Taipei (TW); Chia-Wei Chi, New Taipei (TW)

(73) Assignee: VIVOTEK INC., New Taipei (TW)

( * ) Notice: Subject to any disclaimer, the term of this patent is extended or adjusted under 35 U.S.C. 154(b) by 101 days.

(21) Appl. No.: 16/197,361

(22) Filed: Nov. 21, 2018

(65) Prior Publication Data

US 2020/0160085 A1 May 21, 2020

(51) Int. Cl.
*G06K 9/38* (2006.01)
*G06K 9/32* (2006.01)
*G06T 7/194* (2017.01)
*G06N 5/04* (2006.01)

(52) U.S. Cl.
CPC .............. *G06K 9/38* (2013.01); *G06K 9/3241* (2013.01); *G06N 5/046* (2013.01); *G06T 7/194* (2017.01)

(58) Field of Classification Search
CPC ........ G06T 7/192; G06K 9/3241; G06K 9/38; G06K 9/342; G06K 9/34; G06K 9/36; G06K 9/40; G06N 5/046
USPC .................. 382/73, 155, 232, 254, 266, 283
See application file for complete search history.

(56) References Cited

U.S. PATENT DOCUMENTS

| | | | |
|---|---|---|---|
| 2009/0060330 A1* | 3/2009 | Liu | G06K 9/342 382/173 |
| 2015/0278616 A1* | 10/2015 | Li | G06T 7/194 382/103 |
| 2017/0091951 A1* | 3/2017 | Yoo | G06T 7/11 |
| 2017/0256058 A1* | 9/2017 | Seo | G06T 7/13 |
| 2019/0094875 A1* | 3/2019 | Schulter | G06T 7/11 |
| 2019/0287234 A1* | 9/2019 | Panda | G06T 7/11 |

* cited by examiner

*Primary Examiner* — Congvan Tran
(74) *Attorney, Agent, or Firm* — Winston Hsu

(57) ABSTRACT

A convolutional neutral network identification efficiency increasing method is applied to a related device. The convolutional neutral network identification efficiency increasing method includes analyzing an input image to acquire foreground information, utilizing the foreground information to generate a foreground mask, and transforming the input image into an output image via the foreground mask. The output image is used to be an input of the convolutional neutral network identification for preferred object identification efficiency.

20 Claims, 9 Drawing Sheets

CONVOLUTIONAL NEUTRAL NETWORK IDENTIFICATION EFFICIENCY INCREASING METHOD AND RELATED CONVOLUTIONAL NEUTRAL NETWORK IDENTIFICATION EFFICIENCY INCREASING DEVICE

BACKGROUND OF THE INVENTION

1. Field of the Invention

The present invention relates to an image identification method and a related device, and more particularly, to convolutional neutral network identification efficiency increasing method and a convolutional neutral network identification efficiency increasing device applied to image identification.

2. Description of the Prior Art

A conventional image identification technique based on convolutional neutral network (CNN) algorithm can use the original monitoring image as input information. The original monitoring image has massive amounts of data so that efficiency of the image identification is difficult to increase. The conventional image identification technique may choose a small range within the original monitoring image for increasing the efficiency of the image identification; although the small range has small amounts of data, an object inside the small-range image is easily affected by noise of the complicated environment and cannot acquire an accurate identification result. Thus, design of a method of increasing efficiency of the convolutional neutral network identification is an important issue in the monitoring industry.

SUMMARY OF THE INVENTION

The present invention provides a convolutional neutral network identification efficiency increasing method and a convolutional neutral network identification efficiency increasing device applied to image identification for solving above drawbacks.

According to the claimed invention, a convolutional neutral network identification efficiency increasing method includes analyzing an input image to acquire foreground information, utilizing the foreground information to generate a foreground mask, and transforming the input image into an output image via the foreground mask. The output image is used to be an input of convolutional neutral network identification for increasing object identification efficiency.

According to the claimed invention, a convolutional neutral network identification efficiency increasing device includes an image generator and an operational processor. The image generator is adapted to acquire an input image. The operational processor is electrically connected to the image generator, and adapted to analyze an input image for acquiring foreground information, utilize the foreground information for generating a foreground mask, and transform the input image into an output image via the foreground mask, wherein the output image is used to be an input of convolutional neutral network identification for increasing object identification efficiency.

The convolutional neutral network identification efficiency increasing method and the convolutional neutral network identification efficiency increasing device of the present invention can separate the foreground information from the input image, and define the foreground mask in different situations by classifying pixel distribution of the foreground information, so that unessential information of the input image can be effectively filtered via transformation of the foreground mask, and the generated output image can be the input of the convolutional neutral network identification for increasing the convolutional neutral network identification accuracy. The input image can be applied by any kind of color space, such as RGB, YUV, HSL or HSV. The input images, the foreground information related to the input image, the foreground mask and the output image are created by mutual transformation and can have the same dimensions. In addition, the gray level of pixels inside the output image can be optionally limited in a specific range, so as to decrease a storage demand of the convolutional neutral network identification efficiency increasing device for effective execution of a great quantity of image information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
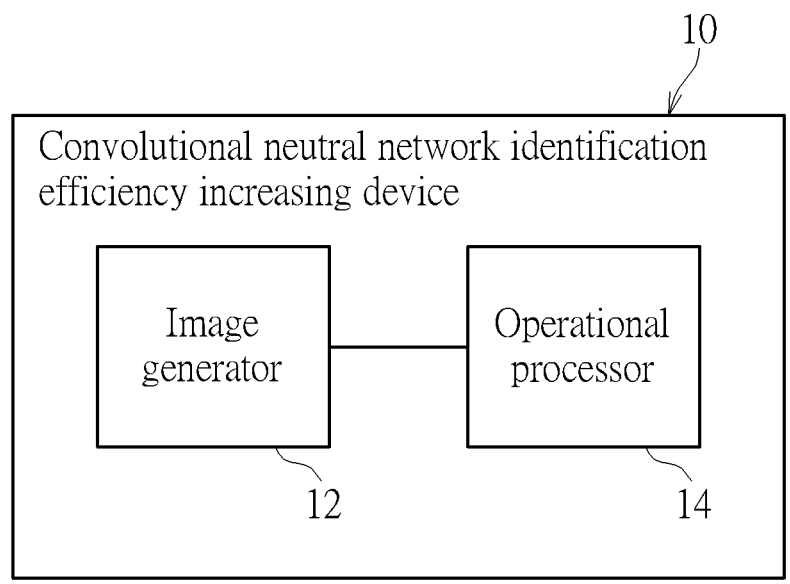
FIG. 1 is a functional block diagram of a convolutional neutral network identification efficiency increasing device according to an embodiment of the present invention.

Please refer to FIG. 1. FIG. 1 is a functional block diagram of a convolutional neutral network identification efficiency increasing device 10 according to an embodiment of the present invention. The convolutional neutral network identification efficiency increasing device 10 can include an image generator 12 and an operational processor 14 electrically connected to each other. The image generator 12 is used to acquire an input image I1. The image generator 12 can be an image capturing unit which can directly capture image information about a monitoring region as the input image I1. Further, the image generator 12 may be an image receiver which can receive image information captured by an external image capturing unit in a wire manner or in a wireless manner as the input image I1. The input image I1 is mainly applied to object identification technique based on CNN (Convolutional Neutral Network) algorithm. Therefore, the operational processor 14 can execute a convolutional neutral network identification efficiency increasing method for improving object identification efficiency via the CNN algorithm in the complicated environment.

Figure 2:
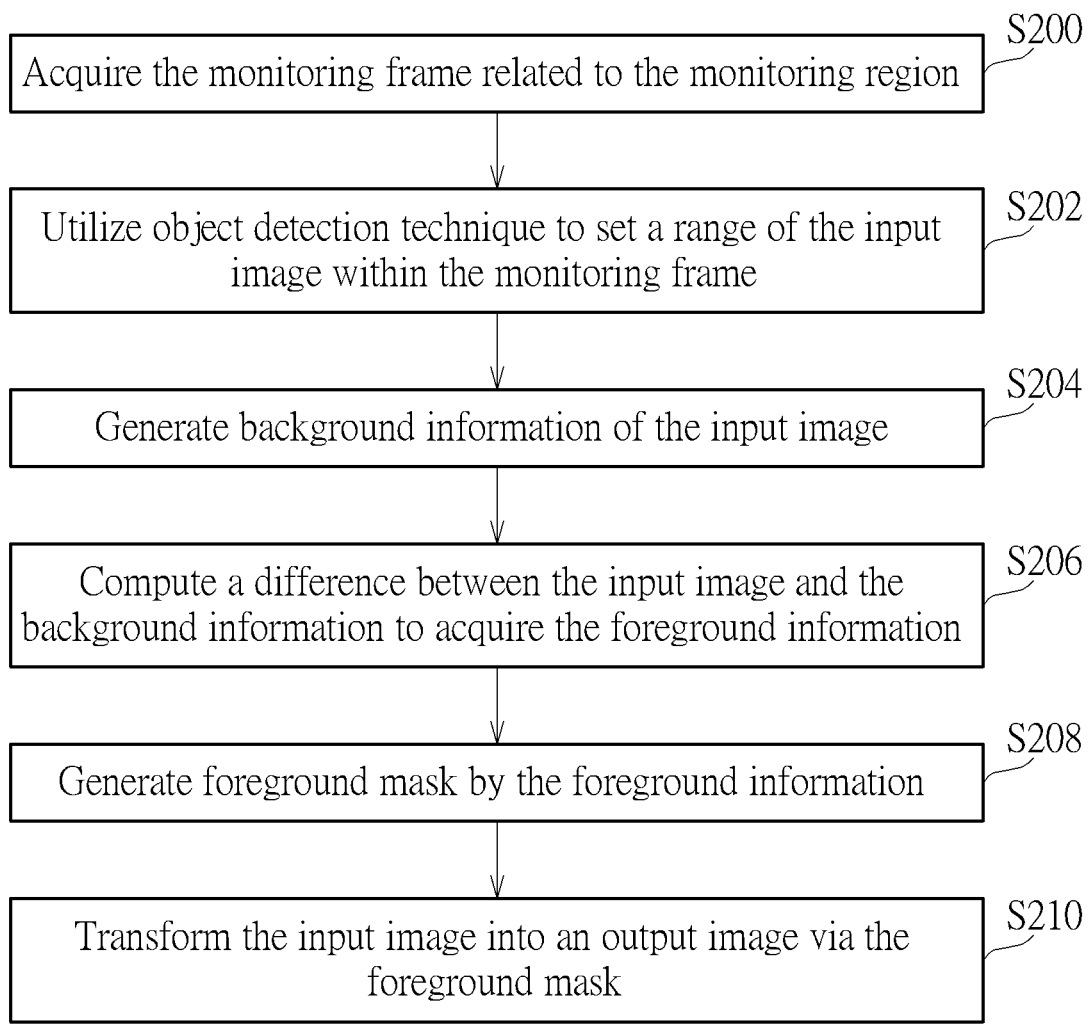
FIG. 2 is a flow chart of the convolutional neutral network identification efficiency increasing method according to the embodiment of the present invention.
Figure 3:
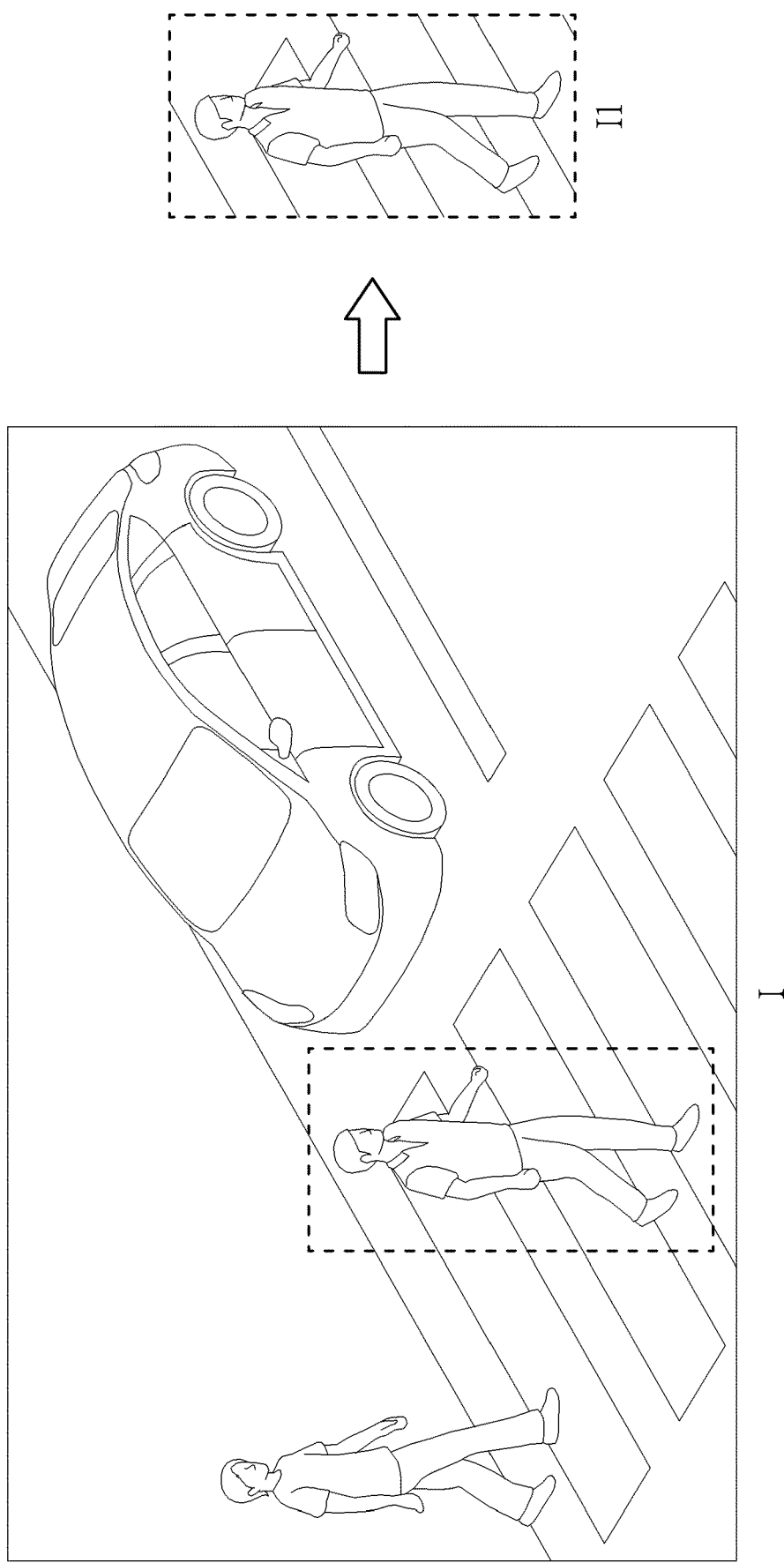
FIG. 3 to FIG. 6 respectively are diagrams of the input image in different transformation stages according to the embodiment of the present invention.
Figure 4:
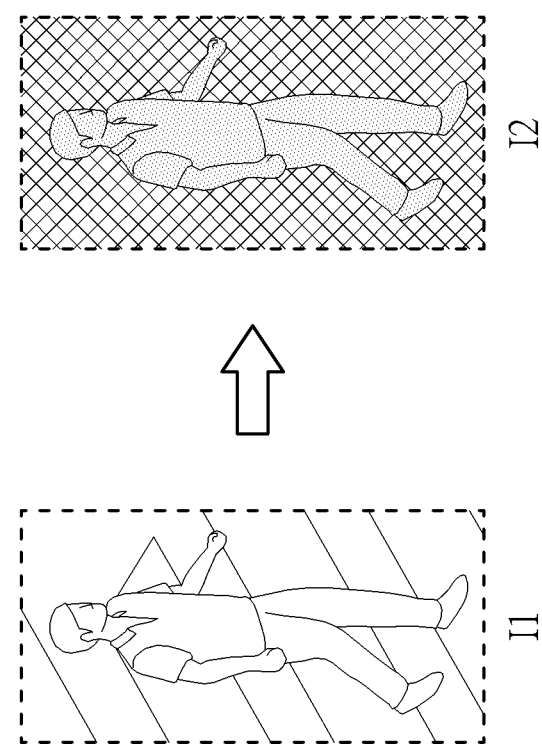
Figure 5:
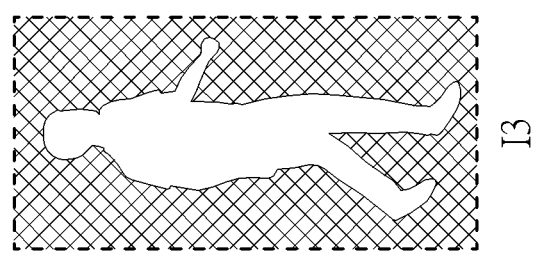
Figure 5:
Figure 5:
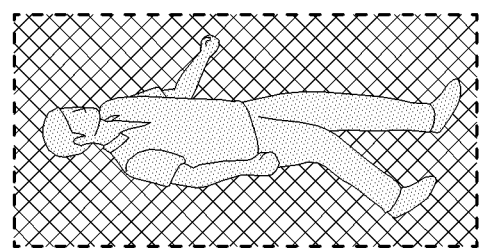
Figure 6:
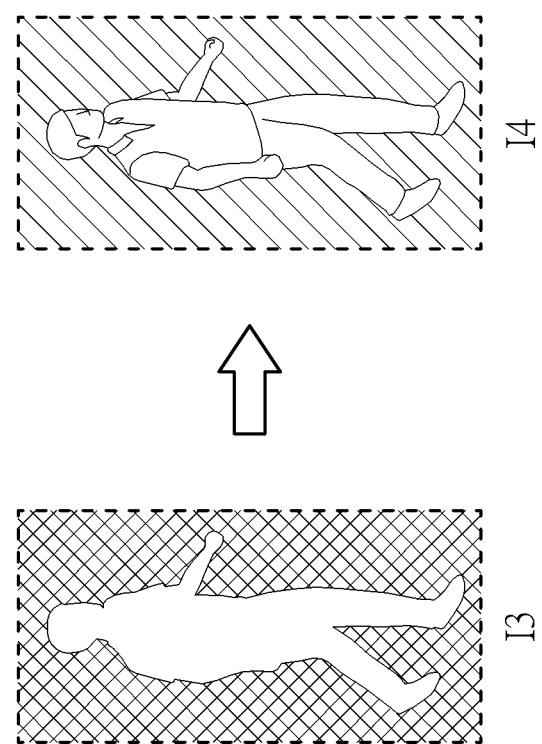

Please refer to FIG. 2 to FIG. 6. FIG. 2 is a flow chart of the convolutional neutral network identification efficiency increasing method according to the embodiment of the present invention. FIG. 3 to FIG. 6 respectively are diagrams of the input image I1 in different transformation stages according to the embodiment of the present invention. The convolutional neutral network identification efficiency increasing method illustrated in FIG. 2 is suitable for the convolutional neutral network identification efficiency increasing device 10 shown in FIG. 1. First, step S200 and step S202 are executed to acquire a monitoring frame I related to the monitoring region, and utilize object detection technique to set a range of the input image I1 within the monitoring frame I. An embodiment shown in FIG. 3 can set a small range of the input image I1 inside the monitoring frame I, and an actual application is not limited to the above-mentioned embodiment; for example, the whole monitoring frame I can be set as the input image I1. Then, step S204 and step S206 are executed to generate background information of the input image I1, and compute a difference between the input image I1 and the background information to acquire the foreground information I2. The background information of the input image I1 can be made by Mixture of Gaussians (MOG) or background subtraction based on the CNN algorithm or any available algorithm.

Step S204 and step S206 can analyze the input image I1 to acquire the foreground information I2. A method of acquiring the background information and then computing the difference between the input image I1 and the background information to generate the foreground information I2 is one acquirement of the foreground information I2, and an actual application depends on design demand. Next, step S208 and step S210 are executed to generate foreground mask I3 by the foreground information I2, and transform the input image I1 into an output image I4 via the foreground mask I3. As the monitoring frame I is related to the complicated environment, such as busy roads and intersections, the input image I1 may contain a lot of background patterns, which effects detection accuracy, even if the input image I1 is the small range inside the monitoring frame I. The present invention can filter background objects from the input image I1 via the foreground information I2, as the output image I4 without the background objects shown in FIG. 6. Therefore, the output image I4 can be an input of convolutional neutral network identification for decreasing background interference inside the complicated environment and effectively increasing the object identification efficiency and the detection accuracy.

Figure 7:
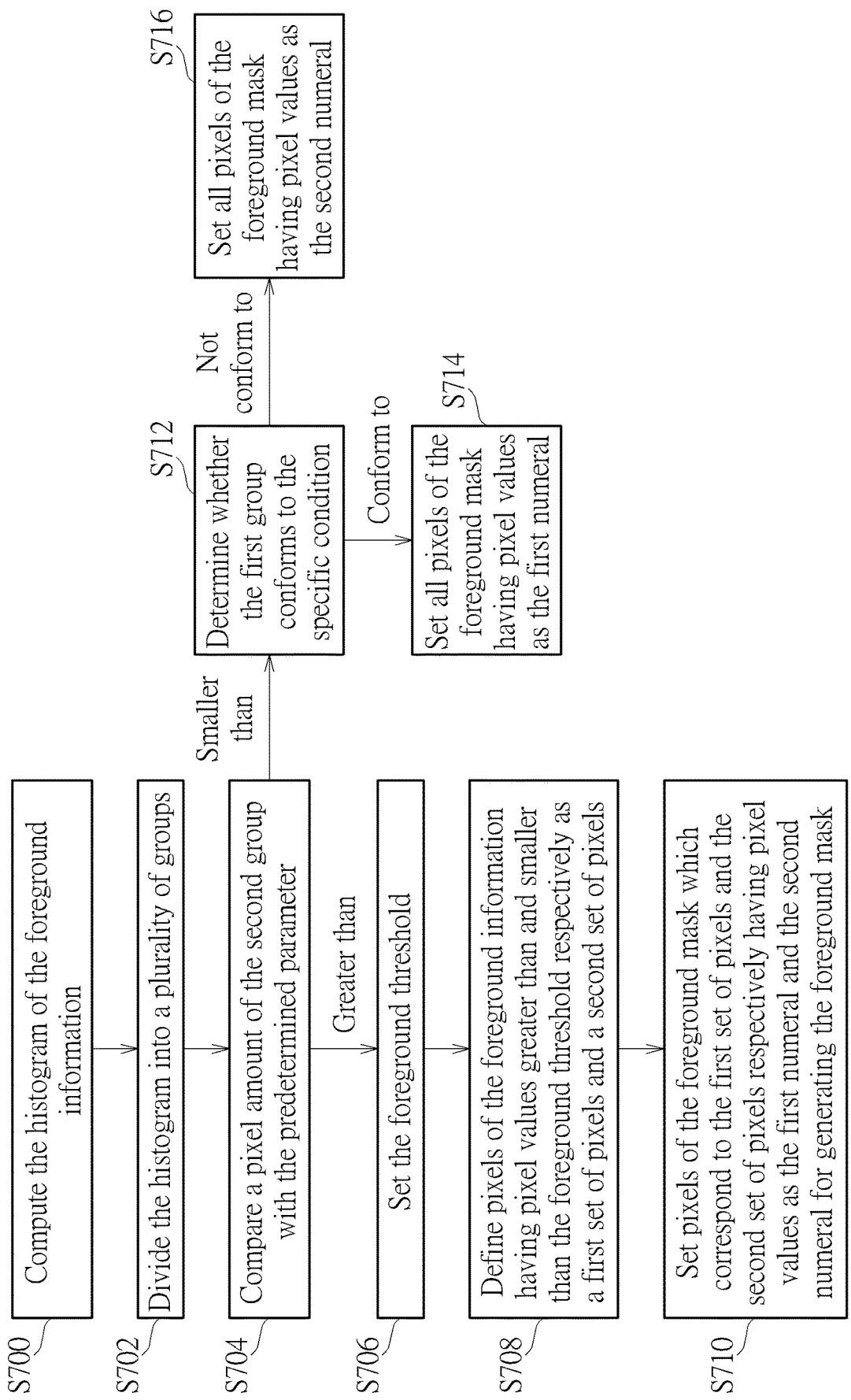
FIG. 7 is a flow chart of generating the foreground mask according to the embodiment of the present invention.
Figure 8:
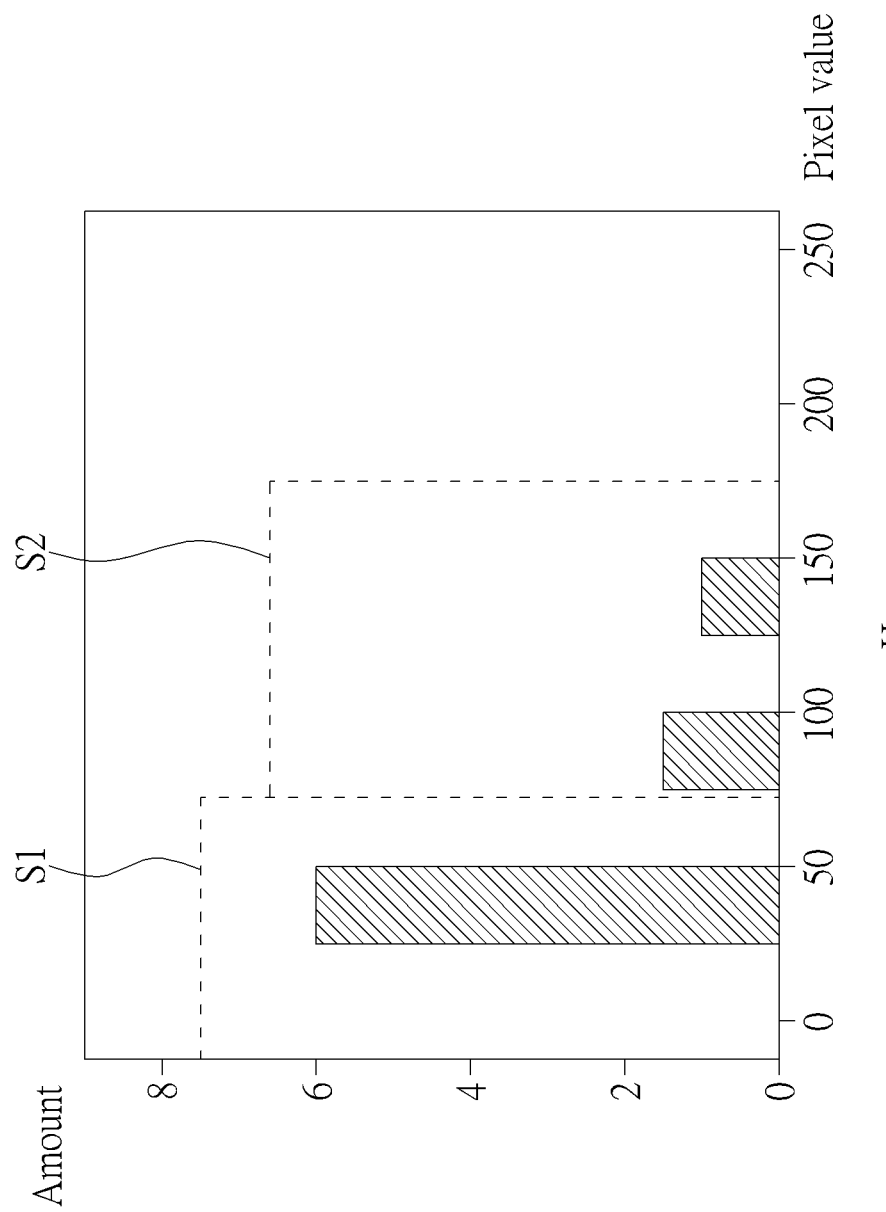
FIG. 8 is a diagram of a histogram H transformed from the foreground information according to the embodiment of the present invention.

Please refer to FIG. 3 to FIG. 8. FIG. 7 is a flow chart of generating the foreground mask I3 according to the embodiment of the present invention. FIG. 8 is a diagram of a histogram H transformed from the foreground information I2 according to the embodiment of the present invention. First, step S700 and step S702 are executed to compute the histogram H of the foreground information I2, and divide the histogram H into a plurality of groups according to its pixel value ranges, such as a first group S1 and a second group S2. A pixel value range of the first group S1 is smaller than a pixel value range of the second group S2. Then, step S704 is executed to compare a pixel amount of the second group S2 with a predetermined parameter. The predetermined parameter may be designed in accordance with statistic data; for example, the predetermined parameter can be determined according to somewhere the monitoring frame I is related, or can be defined by a ratio of the pixel amount of the second group S2 to the pixel amount of the pixel amount. When the pixel amount of the second group S2 is greater than the predetermined parameter, the input image I1 can be represented as having a dynamic object; when the pixel amount of the second group S2 is smaller than the predetermined parameter, the object inside the input image I1 may be static or interfered by noise.

When the pixel amount of the second group S2 is greater than the predetermined parameter, the input image I1 is obviously different from the background information, so that step S706 is executed to set a foreground threshold; for example, the foreground threshold can be forty percent of a mean of all pixel values inside the histogram H. A percentage of the foreground threshold is not limited to the above-mentioned value, and depends on design demand. Next, step S708 is executed to define pixels of the foreground information I2 having pixel values greater than the foreground threshold as a first set of pixels, and further define pixels of the foreground information I2 having pixel values smaller than the foreground threshold as a second set of pixels. Step S710 is executed to set pixels of the foreground mask which correspond to the first set of pixels and the second set of pixels respectively having pixel values as a first numeral and a second numeral, for generation of the foreground mask I3. For example, the first numeral can be one, as the non-grid area of the foreground mask I3 shown in FIG. 5, and the second numeral can be zero, as the grid area of the foreground mask I3 shown in FIG. 5.

When the pixel amount of the second group S2 is smaller than the predetermined parameter, the input image I1 is similar to the background information, so that step S712 is executed to determine whether the first group S1 conforms to a specific condition. The specific condition may indicate the first group S1 has a large number of pixels, and an actual amount of pixels depends on the actual environment and statistic data. As the first group S1 conforms to the specific condition, pixels of the histogram H are massed in a low range and the input image I1 can be represented as having the static object, so that step S714 is executed to set all pixels of the foreground mask I3 having pixel values as the first numeral. When the first numeral is one, the input image I1 can be the output image I4 as an input of convolutional neutral network identification. As the first group S1 does not conform to the specific condition, pixels of the histogram H are distributed at random and the input image I1 can be represented as being interfered by noise, so that step S716 is executed to set all pixels of the foreground mask I3 having pixel values as the second numeral. The input image I1 can be abandoned when the second numeral is zero.

In step S210, the input image I1 can be transformed into the output image I4 via the foreground mask I3; products of all pixel values inside the input image I1 and corresponding pixel values inside the foreground mask I3 can be computed and set as each pixel value of the output image I4. Further, after computing the products of all pixel values inside the input image I1 and corresponding pixel values inside the foreground mask I3, some of the products which have positions corresponding to pixel positions inside the foreground mask I3 not belonging to the second numeral can be defined as a first set of products, and some of the products which have positions corresponding to pixel positions inside the foreground mask I3 belonging to the second numeral can be defined as a second set of products. The second set of products can be classified as the background; if the second set of products is set as the second numeral, background pixels of the output image I4 belonging to the second set of products are black, and an object inside the output image I4 cannot provide preferred colorful effect. The second set of products can be replaced with a reference value (such as a slash area of the output image I4 shown in FIG. 6), and the first set of products and reference values can be used to be pixel values of the output image I4. For example, the object inside the output image I4 may be a black-and-white pattern, and the second set of products defining as the second numeral (such as black) may be confused with the said black-and-white object. Thus, the second set of products can be optionally defined as other color, such as gray, for clearly distinguishing the object from the background.

Figure 9:
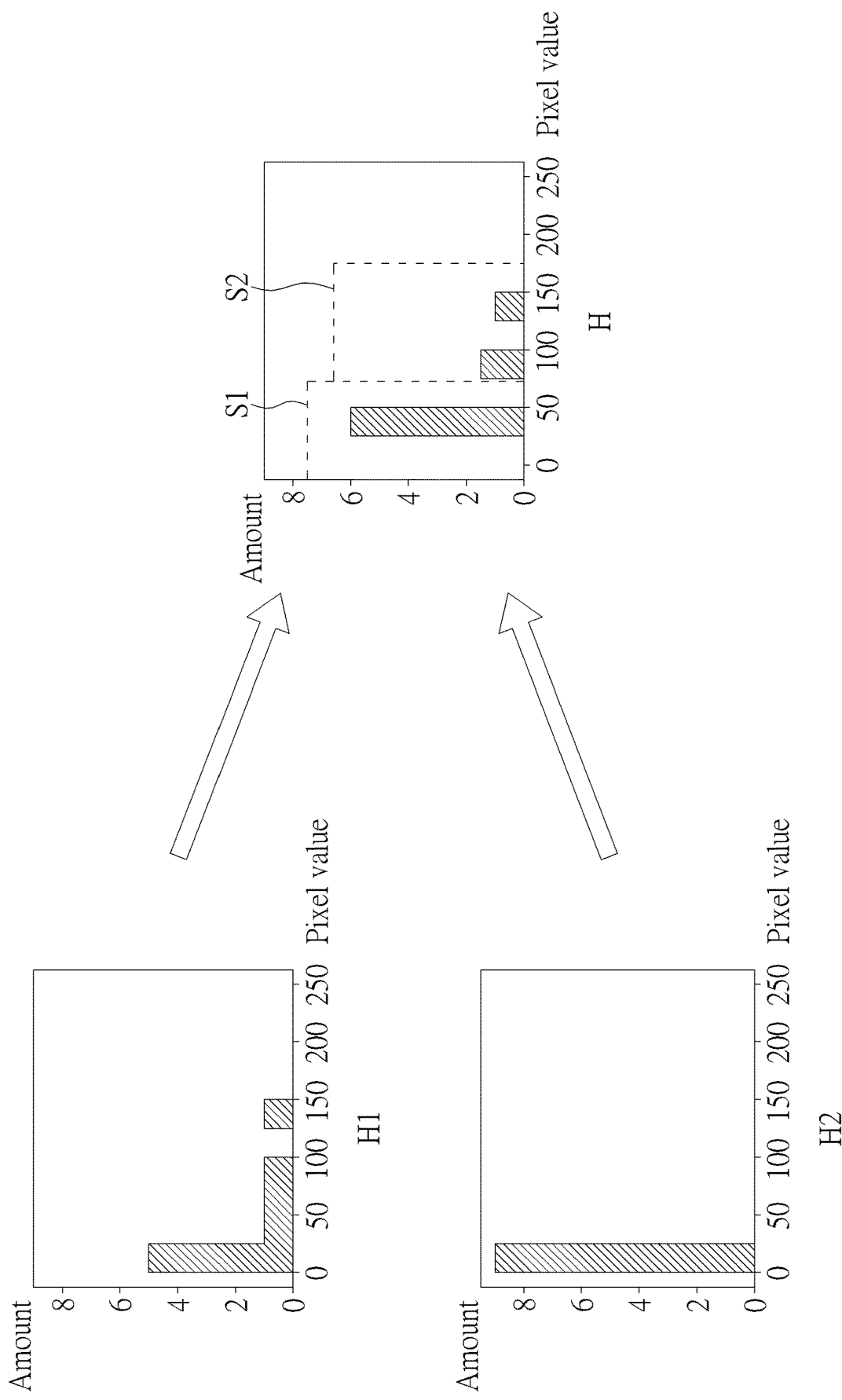
FIG. 9 is a diagram of pixel distribution for analyzing the foreground mask according to the embodiment of the present invention.

Please refer to FIG. 7 to FIG. 9. FIG. 9 is a diagram of pixel distribution for analyzing the foreground mask according to the embodiment of the present invention. In step S704, the pixel amount of the second group S2 is compared with the predetermined parameter, and the present invention can further set a first histogram model H1 and a second histogram model H2 for improvement in execution of step S704. As the histogram H of the foreground information I2 is similar to the first histogram model H1, the second group S2 has the large number of pixel amounts (which is greater than the predetermined parameter), and step S708 can be executed continuously. As the pixel amount of the second group S2 is fewer (which is smaller than the predetermined parameter), step S712 can be executed to determine whether the histogram H of the foreground information I2 is similar to the second histogram model H2. If the histogram H is similar to the second histogram model H2, the first group S1 conforms to the specific condition having the large number of pixels, and step S714 can be executed to generate the foreground mask I3. If the histogram H is dissimilar from the second histogram model H2, which means the first group S1 has fewer pixel amounts and does not conform to the specific condition, step S716 can be executed to abandon the input image I1. The first histogram model H1 can be used to indicate the predetermined parameter via a visual pattern, and the second histogram model H2 can be used to indicate the specific condition via a visual pattern; actual types of the histogram model are not limited to the above-mentioned embodiment.

In conclusion, the convolutional neutral network identification efficiency increasing method and the convolutional neutral network identification efficiency increasing device of the present invention can separate the foreground information from the input image, and define the foreground mask in different situations by classifying pixel distribution of the foreground information, so that unessential information of the input image can be effectively filtered via transformation of the foreground mask, and the generated output image can be the input of the convolutional neutral network identification for increasing the convolutional neutral network identification accuracy. It should be mentioned that the input image can be applied by any kind of color space, such as RGB, YUV, HSL or HSV. The input images, the foreground information related to the input image, the foreground mask and the output image are created by mutual transformation and can have the same dimensions. In addition, the gray level of pixels inside the output image can be optionally ranged from 0 to 128, so as to decrease a storage demand of the convolutional neutral network identification efficiency increasing device for effective execution of a great quantity of image information; the foreground mask can be the binary image, and the output image can be the 128 gray level image or the 256 gray level image. Comparing to the prior art, the present invention can improve efficiency of the convolutional neutral network identification by filtering background noise from the input image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A convolutional neutral network identification efficiency increasing method, comprising:
analyzing an input image to acquire foreground information;
computing a histogram of the foreground information;
dividing the histogram into at least one first group and at least one second group via its pixel value ranges, wherein a pixel value range of the first group is smaller than a pixel value range of the second group;
comparing a pixel amount of the second group with a predetermined parameter; and
generating a foreground mask according to a comparison result; and
transforming the input image into an output image via the foreground mask, wherein the output image is used to be an input of convolutional neutral network identification for increasing object identification efficiency;
wherein generating the foreground mask comprises: setting a foreground threshold when the pixel amount of the second group is greater than the predetermined parameter, defining pixels of the foreground information having pixel values greater than the foreground threshold as a first set of pixels, defining pixels of the foreground information having pixel values smaller than the foreground threshold as a second set of pixels, and setting pixels of the foreground mask which corresponds to the first set of pixels having pixel values as a first numeral, and setting pixels of the foreground mask which corresponds to the second set of pixels having pixel values as a second numeral;
wherein generating the foreground mask further comprises: determining whether the first group conforms to a specific condition when the pixel amount of the second group is smaller than the predetermined parameter, and setting pixels values of all pixels inside the foreground mask as a first numeral when the first group conforms to the specific condition.

2. The convolutional neutral network identification efficiency increasing method of claim 1, further comprising:
utilizing object detection technique to set a range of the input image within a monitoring frame.

3. The convolutional neutral network identification efficiency increasing method of claim 1, wherein analyzing the input image to acquire the foreground information comprises:
generating background information of the input image; and
computing a difference between the input image and the background information to acquire the foreground information.

4. The convolutional neutral network identification efficiency increasing method of claim 1, wherein pixels values of all pixels inside the foreground mask are set as a second numeral when the first group does not conform to the specific condition.

5. The convolutional neutral network identification efficiency increasing method of claim 1, wherein transforming the input image into the output image via the foreground mask comprises:
computing products of all pixel values inside the input image and corresponding pixel values inside the foreground mask respectively;

defining some of the products which have positions corresponding to pixel positions inside the foreground mask not belonging to a second numeral as a first set of products;

defining some of the products which have positions corresponding to pixel positions inside the foreground mask belonging to the second numeral as a second set of products;

replacing the second set of products with a reference value; and utilizing the first set of products and the reference value to generate the output image.

6. The convolutional neutral network identification efficiency increasing method of claim 1, wherein a grey level of pixels inside the output image is ranged from 0 to 128.

7. The convolutional neutral network identification efficiency increasing method of claim 1, wherein a dimension of the foreground mask is identical with a dimension of the input image.

8. A convolutional neutral network identification efficiency increasing device, comprising:

an image generator adapted to acquire an input image; and an operational processor electrically connected to the image generator, and adapted to analyze an input image for acquiring foreground information, compute a histogram of the foreground information, divide the histogram into at least one first group and at least one second group via its pixel value ranges, compare a pixel amount of the second group with a predetermined parameter, and generate a foreground mask according to a comparison result, and transform the input image into an output image via the foreground mask, wherein the output image is used to be an input of convolutional neutral network identification for increasing object identification efficiency;

wherein a pixel value range of the first group is smaller than a pixel value range of the second group;

wherein the operational processor is further adapted to set a foreground threshold when the pixel amount of the second group is greater than the predetermined parameter, define pixels of the foreground information having pixel values greater than the foreground threshold as a first set of pixels, define pixels of the foreground information having pixel values smaller than the foreground threshold as a second set of pixels, and set pixels of the foreground mask which corresponds to the first set of pixels having pixel values as a first numeral and set pixels of the foreground mask which corresponds to the second set of pixels having pixel values as a second numeral;

wherein the operational processor is further adapted to determine whether the first group conforms to a specific condition when the pixel amount of the second group is smaller than the predetermined parameter, and set pixels values of all pixels inside the foreground mask as a first numeral when the first group conforms to the specific condition.

9. The convolutional neutral network identification efficiency increasing device of claim 8, wherein the operational processor is further adapted to generate background information of the input image, and compute a difference between the input image and the background information for acquiring the foreground information.

10. The convolutional neutral network identification efficiency increasing device of claim 8, wherein pixels values of all pixels inside the foreground mask are set as a second numeral when the first group does not conform to the specific condition.

11. The convolutional neutral network identification efficiency increasing device of claim 8, wherein the operational processor is further adapted to compute products of all pixel values inside the input image and corresponding pixel values inside the foreground mask respectively to generate the output image.

12. The convolutional neutral network identification efficiency increasing device of claim 8, wherein the operational processor is further adapted to compute products of all pixel values inside the input image and corresponding pixel values inside the foreground mask respectively, define some of the products which have positions corresponding to pixel positions inside the foreground mask not belonging to a second numeral as a first set of products, define some of the products which have positions corresponding to pixel positions inside the foreground mask belonging to the second numeral as a second set of products, replace the second set of products with a reference value, and utilize the first set of products and the reference value to generate the output image.

13. The convolutional neutral network identification efficiency increasing device of claim 8, wherein a grey level of pixels inside the output image is ranged from 0 to 128.

14. The convolutional neutral network identification efficiency increasing device of claim 8, wherein a dimension of the foreground mask is identical with a dimension of the input image.

15. A convolutional neutral network identification efficiency increasing method, comprising:

analyzing an input image to acquire foreground information;

computing a histogram of the foreground information;

dividing the histogram into at least one first group and at least one second group via its pixel value ranges, wherein a pixel value range of the first group is smaller than a pixel value range of the second group;

comparing a pixel amount of the second group with a predetermined parameter; and generating a foreground mask according to a comparison result; and computing products of all pixel values inside the input image and corresponding pixel values inside the foreground mask respectively to generate an output image, wherein the output image is used to be an input of convolutional neutral network identification for increasing object identification efficiency.

16. The convolutional neutral network identification efficiency increasing method of claim 15, further comprising:

utilizing object detection technique to set a range of the input image within a monitoring frame.

17. The convolutional neutral network identification efficiency increasing method of claim 15, wherein analyzing the input image to acquire the foreground information comprises:

generating background information of the input image; and computing a difference between the input image and the background information to acquire the foreground information.

18. The convolutional neutral network identification efficiency increasing method of claim 15, wherein transforming the input image into the output image via the foreground mask comprises:

computing products of all pixel values inside the input image and corresponding pixel values inside the foreground mask respectively;

defining some of the products which have positions corresponding to pixel positions inside the foreground mask not belonging to a second numeral as a first set of products;

defining some of the products which have positions corresponding to pixel positions inside the foreground mask belonging to the second numeral as a second set of products;

replacing the second set of products with a reference value; and utilizing the first set of products and the reference value to generate the output image.

19. The convolutional neutral network identification efficiency increasing method of claim 15, wherein a grey level of pixels inside the output image is ranged from 0 to 128.

20. The convolutional neutral network identification efficiency increasing method of claim 15, wherein a dimension of the foreground mask is identical with a dimension of the input image.

* * * * *